May 22, 1945. B. F. TELLKAMP 2,376,634
EDGE-WOUND TUBULAR EXPANSIBLE MEMBER
Filed March 1, 1943 2 Sheets-Sheet 1
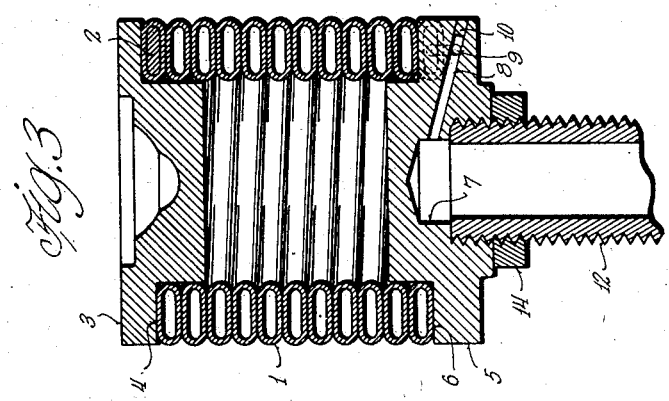
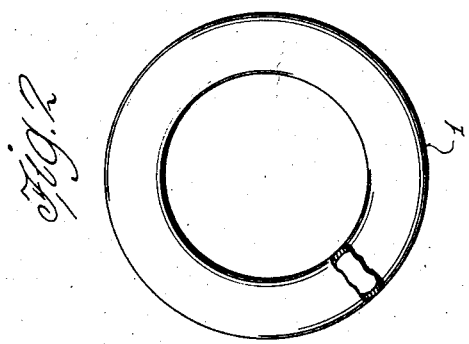
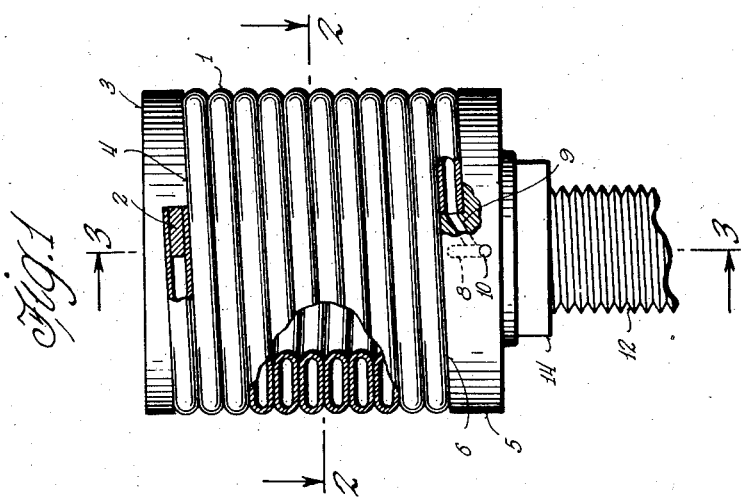
INVENTOR
Bernhard F. Tellkamp
BY David A. Fy
ATTORNEY.

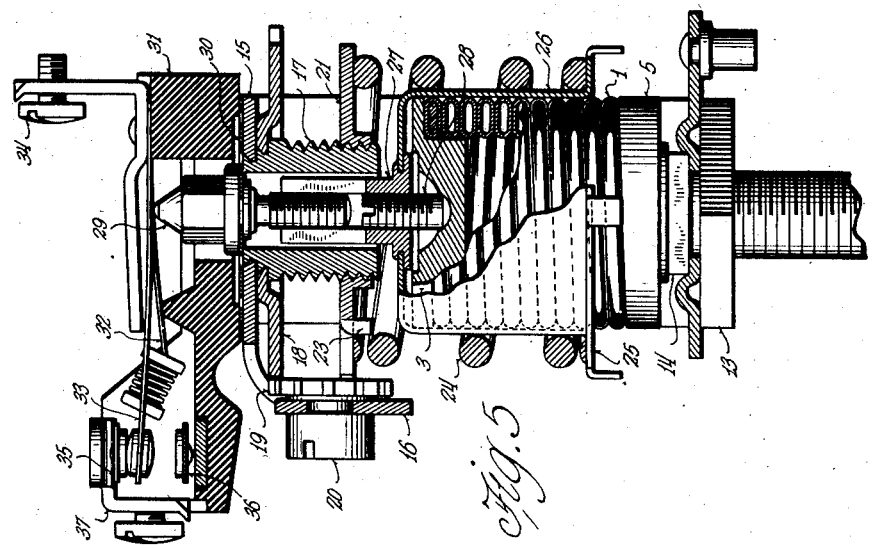

Patented May 22, 1945

2,376,634

UNITED STATES PATENT OFFICE 2,376,634

EDGE-WOUND TUBULAR EXPANSIBLE MEMBER

Bernhard F. Tellkamp, Whitefish Bay, Wis., assignor to Allen-Bradley Company, Milwaukee, Wis., a corporation of Wisconsin Application March 1, 1943, Serial No. 477,676

7 Claims. (Cl. 137—156)

This invention relates to expansible members wherein resilient deflection of enclosing walls accommodates a displacement or a pressure change and correlates the same with a movement or a thrust and it resides in an improved form thereof in which the expansible member is in the form of an elongated flattened resilient tube edge-wound in such manner that a plurality of contiguous helical turns are formed, so that the summation of the action of the individual resilient turns may be availed of.

One object of this invention is to provide a resilient displacement device which will stand large working pressures and large peak pressures without rupture or permanent deformation.

Another object of this invention is to provide a resilient displacement device capable of producing a thrust of high intensity.

Another object of this invention is to provide a resilient displacement device which can be made in compact form considering its capability for performance.

Heretofore resilient displacement devices have been constructed principally in the form of the well known metal bellows composed of a circumferentially or helically corrugated shell. In the case of such bellows the thrusting action is the result of hydrostatic pressure acting upon the walls which close the ends of the extensible shell. The corrugated wall of such a bellows must be capable of elastic longitudinal deformation and at the same time must be capable of resisting hydraulic pressure acting transversely. When the prevailing pressure to be handled is high, such a shell must have a high wall strength to resist the transverse thrust. This may be provided by strengthening the shell wall, but the desired longitudinal resilience is thus greatly reduced. It therefore becomes necessary, for higher pressures, to employ bellows of increased length and as the pressure to be accommodated increases, the length of the bellows becomes exaggerated. A bellows of exaggerated length easily buckles instead of producing the desired intensity of thrust. Because of these limitations, corrugated wall bellows have not been successfully employed where high pressures are encountered.

Another form of expansible thrusting device which has heretofore been employed is of the wafer type. In the case of the wafer type of thruster, whether used singly or in multiple, the thrusting action, developed by a distributed pressure, is born upon a point of concentrated stress at or near the center of the wafer disk. Because of this characteristic, a problem is involved much like the problem encountered in the case of the corrugated wall bellows. If the wafer wall is made stiff enough to withstand high pressures, then the desired scope of elastic deflection is lost.

Because of the limitations of thrusting devices of the resilient wall type in forms heretofore known, cylinders with sliding plungers have been the only instrumentalities available for actuating pressure switches and the like at higher pressures. In many cases the high pressure actuating fluid is gaseous, or highly volatile and leakage between the plunger and cylinder barrel has caused serious trouble. Packings sufficiently tight to control such leakage have introduced substantial friction thus interfering with the accurate operation of a pressure switch or like apparatus intended to respond at a definite pressure. The apparatus of this invention, being hermetically sealed and capable of operation at higher pressures, therefore constitutes an important improvement.

In contrast with the limitations of the constructions heretofore employed for the purpose, the apparatus of this invention can be easily made in compact form so as to function with reliability and without permanent deformation at pressure several times the pressures previously considered feasible for resilient displacement devices. This is accomplished in this invention through the discovery that the non-thrust producing forces can be reduced and can be made to balance one another through stresses which are largely tensile stresses so that the walls of the expansible member can be given the desired resiliency. The manner of accomplishment of the desired objects will become apparent from the description of the invention which follows:

This invention is herein described by reference to the accompanying drawings, wherein there is set forth by way of illustration and not of limitation one form of resilient displacement member of this invention and the mode of application of the same to the operation of one of the devices for which such member is adapted.

In the drawings:

Fig. 1 is a side elevation of an expansible member of this invention, parts thereof being shown broken away and in section;

Fig. 2 is a sectional plan view, viewed through the plane 2—2 indicated in Fig. 1;

Fig. 3 is a sectional view in elevation, viewed through the plane 3—3 indicated in Fig. 1;

Fig. 4 is a front view in elevation showing an expansible member of this invention applied to the operation of a pressure switch; and Fig. 5 is a side elevation partly in section and partly broken away, the sectioned parts thereof being viewed through the plane 5—5 indicated in Fig. 4.

Referring now particularly to Figs. 1, 2 and 3, the apparatus of this invention is shown as being made up of an elongated flattened tubular element 1, composed of stainless steel or other suitable material of similar characteristics, which is edge-wound into the form of a helix. The several turns of the helix are held together with the flattened sides of adjacent turns in contact. The upper end of the element 1 is closed by a plug 2, which may be soldered in place to form a hermetical seal. Superimposed upon the top of the element 1 is a top head 3 having a single turn helical seat 4 of approximately the same diameter and pitch as the coil, so as to uniformly engage the entire upper exposed surface of the top turn of element 1. If desired the top head 3 may be secured to the element 1 by soldering not shown.

At the lower end of the element 1 a bottom head 5 having a helical seat 6 similar to the seat 4 is provided. The bottom head 5 (see Fig. 3) is provided with a central bore 7 from which a lateral bore 8 extends radially to communicate with an inclined circumferential bore 9. The outer end of the bore 8 is closed by a plug 10 thus providing a channel from the central bore 7 to the vertical step of the helical seat 6. The lower end of the element 1 is open and abuts the vertical step of the helical seat 6 and is hermetically joined therewith as by soldering not shown in such manner as to be in free communication with the bore 9.

The attainment of the full benefits of the action of the unit of this invention is largely dependent upon the support given by the helical seats 4 and 6, but the specific means by which such seats are provided is not important. For example, one or more blind or inactive turns of the helix attached to mountings and produced by solder between adjacent surfaces will serve the purpose quite well. To a limited extent the benefits of this invention may also be obtained when the tube is so deformed that helical seats are not necessary particularly where loading is to be light, but such arrangements are not preferred.

The flattened cross-section of the tube which forms element 1, as shown clearly in Figs. 2 and 3, presents a relatively small projected area in a lateral direction, thus minimizing the forces exerted inwardly and outwardly, that is in a radial direction with respect to the axis of the helix. Thus the actual tension carried in the tubing wall is comparatively small making possible the use of a comparatively thin wall, although in the drawings the wall thickness has been exaggerated to facilitate a clearer showing. The stresses resulting from the pressure prevailing within the tubular element 1 which are exerted in an axial direction with respect to the helix of element 1 are resisted to a relatively minor extent by the easily deflected tubing material itself, and to a major extent by the counter thrust of the particular device which is to be actuated.

Under conditions of use, particularly where abnormal peak pressures are encountered, the heads 4 and 5 may be so mounted that a positive limit is placed upon the extent to which they may separate. By providing such a stop within the limits of elastic deformation of the element 1, the device may be protected against damage by extreme pressures. This follows from the fact that when the heads 4 and 5 are thus restrained, excess stresses due to abnormally high pressures are sustained almost entirely by the stops which limit the travel of the heads. This characteristic of the apparatus of this invention which makes possible its protection against extreme pressure simply by restraining the heads 3 and 5 is a distinct advantage as compared with wafers or bellows of the conventional type where it is not possible to furnish any such backing up effect without seriously interfering with the normal functioning of the device.

For a particular service the appropriate design of the unit of this invention may be arrived at if desired by application of analytical methods. When this is done the width and the thickness of the flattened tube are first selected thus permitting computation of maximum stresses for selected wall thicknesses. These values having been computed for several wall thicknesses may then be compared or plotted for comparison to ascertain the optimum wall thickness. This furnishes a positive guide in design and a clear indication of the adaptability of the unit for the duty intended.

By analysis of this sort the maximum stresses resulting from deflection of the element of this invention appear to occur at the mid-point of the curved ends of the flattened section where bending moment is a maximum. Reduction in the wall thickness of the element diminishes the moment of inertia of the section involved, thus tending to diminish the maxium stress. However, reduction in wall thickness reduces the amount of material available to withstand overall loading, and it is for this reason that for each specific condition of service there is an optimum thickness of the tubing wall at which stress will be a minimum.

An element such as is herein described is useful chiefly when capable of withstanding a large number of repetitions of application of the loading intended, and for this reason in determining the proportions of an element for any given service it is advisable to regard as the limiting factor, the strength of the material employed under fatigue conditions. Even with full regard for this limitation it is possible to construct an element in accordance with this invention capable of withstanding practically unlimited repetition of loading with maximum pressures in the order of several thousand pounds per square inch when employing a cupro-nickel alloy as the material from which the tubular element is constructed. Other alloys with superior physical properties permit of even higher performance.

In a specific instance an element has been constructed of cupro-nickel alloy in accordance with this invention in which the thickness of the flattened section was 0.058 inch and the width of the flattened section was 0.148 inch, the wall thickness being 0.008 inch. An element thus constructed when subjected to repeated application of pressure rising from zero to 1000 lbs. per sq. in. suffered no permanent deformation or visible deterioration after more than 1,000,000 cycles of such operation, under conditions where each turn of the element underwent a deflection of 0.001 inch.

To illustrate the effect of wall thickness greater or less than 0.008 inch in the specific instance mentioned above, the computed maximum stresses for various wall thicknesses for units otherwise the same were plotted and thus the maximum stresses for various wall thicknesses were graphically indicated as follows:

| Wall thickness, inches | Stress, pounds per sq. in |
| --- | --- |
| 0.006 | 57,400 |
| 0.007 | 51,600 |
| 0.008 | 48,300 |
| 0.009 | 47,600 |
| 0.010 | 47,900 |
| 0.011 | 48,700 |

It will be observed that an optimum appears to occur at or about a wall thickness of 0.009 inch. It has been found from actual test that a unit having a wall thickness somewhat in excess of the optimum, that is to say, a thickness of 0.0105 inch is nevertheless still capable of successful operation without damage for more than 1,000,000 cycles when composed of the cupro-nickel alloy above referred to. However, with wall thicknesses much greater or less than the range noted, i. e., 0.008 to 0.0105 inch, maximum stresses rise beyond the limit of capability of the material for this particular design, and it has been found by experience that where the design is so related to loading conditions that maximum computed stresses exceed those indicated for the wall thicknesses of from 0.008 to 0.0105 inch by approximately 25% to 30%, that failure may occur. For example, one such element tested under such conditions failed in less than 100,000 operations.

It should be borne in mind that metallic bellows of the conventional type have not been successfully constructed of reasonable size or proportion which can withstand operating conditions which involve pressures exceeding approximately 300 lbs. per sq. in. This is in marked contrast with the practical results which have actually been observed and obtained with the unit of this invention, when operating at pressures several times the previously accepted limit. While the pressures which the unit of this invention will withstand under repetitive loading conditions are large, the peak pressures which the unit will withstand without apparent ill effect, when occasionally applied, are even larger. For example, the specific units described above, suitable for repetitive loading at 1000 lbs. per sq. in. pressure, when provided with a positive stop which limits deflection to 0.001 inch per turn, will withstand pressures of 4000 to 5000 lbs. per sq. in., occasionally applied with no apparent damage. In fact it is preferred to apply pressures in this range as a final manufacturing step before delivering the unit to the customer, to make sure that it will not fail under such occasional peak pressure and to ensure retention of the calibration characteristics of the unit.

One mode of applying the apparatus of this invention is illustrated in Figs. 4 and 5 where the element 1 is shown carried upon a lower head 5, mounted within a frame 11. The lower head 5 is in fluid tight threaded engagement with a pressure connection 12, which passes through an opening in the lower side of the frame 11 and is clamped in place therein between the lock nuts 13 and 14.

Secured between the upwardly extending arms of the frame 11 is a mounting plate 15 having a downwardly deflected front apron 16. Rotatably carried upon mounting plate 15 and beneath the same is a threaded adjusting sleeve 17 to which a gear 18 is secured. The gear 18 is in meshing relationship with an adjusting pinion 19 mounted upon rotatable adjusting screw 20 which is carried in the apron 16 as shown.

In threaded engagement with the adjusting sleeve 17 and mounted thereon for vertical movement is a spring loading plate 21, which is provided with forwardly projecting ears 22. The ears 22 extend into vertical slots formed in the face of the apron 16 to prevent turning of the plate 21 when the adjusting sleeve 7 is turned. In this way by turning the adjusting screw 20 the plate 21 may be raised or lowered at will. Beneath the plate 21 and held in centered engagement therewith by downwardly deflected lugs 23, one of which appears in Fig. 5, is a loading spring 24. The opposite end of the spring 24 engages a lip 25 formed in the lower margin of a housing 26. The housing 26 is of inverted cup-shaped form on the top of which there is rigidly secured a vertical stem mounting 27 as shown. The mounting 27 is provided with a central threaded bore from which adjusting screw 28 projects downwardly to engage the upper head 3 as shown clearly in Fig. 5. In this way the loading of the spring 24 is applied to the element 1 in a manner subject to regulation by adjustment of the screw 20. By means of this construction excessive deflection is positively prevented by engagement of the flange on the lower end of the mounting 27 with the lower extremity of the adjusting sleeve 17.

The upper internally threaded end of the stem mounting 27 is forked so as to resiliently clamp the adjustable threaded actuating stem 29. The stem 29 is held centered and guided in its vertical movement by a guiding leaf 30 appearing in section in Fig. 5.

Carried upon the mounting plate 15 is an insulating frame 31 of a snap-action switch of well known form. The frame 31 is so positioned as to bring an actuating tongue 32 of the switch into engagement with the insulated upper end of actuating stem 29. The switch parts include in addition to the tongue 32 the movable contact carrier 33 and its terminal 34 and the stationary contacts 35 and 36 and the respective terminals 37 and 38.

The apparatus shown in Figs. 4 and 5 in operation is responsive to changes of pressure within the helical tubular element 1. When pressure increases within the element 1, the flattened section of the tube alters and applies a thrust to the loading spring 24. The spring 24 is deflected in response to this thrust by an amount which is the summation of the individual deflections of the several turns of the coil, such deflection continuing until the reaction of the spring is equal to the thrust exerted by element 1. By adjusting screw 20, the pressure at which sufficient deflection to move the tongue 32 of the switch to the operating point is obtained may be varied and set at the value desired.

This invention has been herein described by reference to one specific form of its embodiment and use. It is intended, however, that the protection of Letters Patent to be granted hereon be not unnecessarily limited thereby, the intent being that the protection hereby granted extend to the full limits of the inventive advance disclosed herein as defined by the claims hereto appended.

I claim:

1. An apparatus for correlating volumetric content with linear movement comprising in combination an elongated resilient walled tube having a flattened cross-section, said tube being formed into a plurality of successive edge-wound helical turns superimposed upon one another with the flattened faces of adjacent turns in contact with one another, said tube being so arranged that it contains fluid, and correlating means embracing the end turns of said tube relatively movable in correlation with changes in volumetric content of said tube resulting from resilient deflection of the walls of said tube.

2. An apparatus for correlating volumetric content with linear movement comprising in combination a resilient walled tube having a flattened cross-section, said tube being formed into a coil comprising a plurality of edge-wound helical turns superimposed upon one another with the flattened faces of adjacent turns in contact with one another, said tube being so arranged that it contains fluid, and heads engaging the ends of said coil movable relative to one another in correlation with changes in volumetric content of said tube resulting from resilient deflections of the walls of said tube.

3. In an apparatus for converting fluid pressure into thrust the combination comprising a support, an elongated flattened resilient walled tube in the form of an edge-wound helix having a plurality of turns in face to face engagement mounted at one end upon said support, said tube being in communication with an entrance passage in said support through an hermetical connection therewith, said tube further being hermetically closed at the end remote from said support, and a thruster cap engaging the end turn of said tube opposite said support adopted to exert a thrust when fluid pressure sufficient to deflect the walls of said tube is applied within said tube.

4. In an apparatus for producing a predetermined movement coordinated with a change in fluid pressure the combination comprising a support, an elongated flattened resilient walled tube in the form of an edge-wound helix having a plurality of turns in face to face engagement mounted at one end upon said support, means forming a fluid tight connection with one end of said tube, means closing the opposite end of said tube, a thruster cap engaging the end turn of said tube opposite said support, loading means interposed between said support and said thruster cap for imposing a predetermined compressive load upon said tube coil, and an actuator engaging said thruster cap to be moved thereby when a fluid pressure sufficient to overcome said loading means and to deflect said tube walls is applied within said tube.

5. In an apparatus for producing a predetermined movement coordinated with a change in fluid pressure the combination comprising a support, an elongated flattened resilient walled tube in the form of an edge-wound helix having a plurality of turns in face to face engagement mounted at one end upon said support, means forming a fluid tight connection with one end of said tube, means closing the opposite end of said tube, a thruster cap engaging the end turn of said tube opposite said support, a spring interposed between said support and said thruster cap for imposing a predetermined compressive load upon said tube coil, and an actuator engaging said thruster cap to be moved thereby when a fluid pressure sufficient to overcome said spring and to deflect said tube walls is applied within said tube.

6. An apparatus for correlating volumetric content with linear thrust comprising in combination a resilient walled tube having a flattened cross-section, said tube being formed into a coil comprising a plurality of edge-wound helical turns superimposed upon one another with the flattened faces of adjacent turns in contact with one another, said tube being so arranged that it contains fluid, a mounting base having a single turn helical seat approximating the diameter and pitch of said coil engaging and supporting one end of said coil, and an actuator head also having a single turn helical seat approximating the diameter and pitch of said tube coil disposed at the end of said tube coil opposite said base in thrust transmitting engagement therewith said head being relatively movable with respect to said base in correlation with changes in volumetric content of said tube resulting from resilient deflection of the walls of said tube.

7. An apparatus for correlating volumetric displacement with linear thrust comprising in combination a resilient walled tube having a flattened cross-section, said tube being formed into a coil comprising a plurality of edge-wound helical turns superimposed upon one another with the flattened faces of adjacent turns in contact with one another, a mounting base having a single turn helical seat approximating the diameter and pitch of said coil engaging and supporting one end of said coil, said base having a fluid entrance passage therein in fluid tight connection with the adjacent end of said tube coil, said tube coil having a fluid tight closure at the end thereof opposite said base.

BERNHARD F. TELLKAMP.